United States Patent
Furtak

(10) Patent No.: US 11,848,952 B2
(45) Date of Patent: *Dec. 19, 2023

(54) SYSTEMS AND METHODS FOR IDENTIFYING ACCESS ANOMALIES USING NETWORK GRAPHS

(71) Applicant: Aetna Inc., Hartford, CT (US)

(72) Inventor: Tomek Furtak, Bristol, CT (US)

(73) Assignee: Aetna Inc., Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/964,227

(22) Filed: Oct. 12, 2022

(65) Prior Publication Data
US 2023/0052533 A1   Feb. 16, 2023

Related U.S. Application Data

(63) Continuation of application No. 16/810,765, filed on Mar. 5, 2020, now Pat. No. 11,503,054.

(51) Int. Cl.
*H04L 9/40* (2022.01)
*G06N 20/00* (2019.01)
(Continued)

(52) U.S. Cl.
CPC ........ *H04L 63/1425* (2013.01); *G06F 18/214* (2023.01); *G06N 20/00* (2019.01);
(Continued)

(58) Field of Classification Search
CPC . H04L 63/1425; H04L 63/08; H04L 63/1416; H04L 63/102; H04L 41/069;
(Continued)

(56) References Cited

U.S. PATENT DOCUMENTS 9,038,180 B2   5/2015  Neil
10,778,664 B1 *  9/2020  Sullivan ................. H04L 63/08
(Continued)

FOREIGN PATENT DOCUMENTS

CN   111600894 A  *  8/2020  ........... G06K 9/6256
CN   111784402 A  *  10/2020 ........... G06N 3/0454
(Continued)

OTHER PUBLICATIONS

Saito et al. "Network Monitoring Device, Program and Method" JP 2018073140 A. English translation. May 10, 2018. (Year: 2018).*
(Continued)

*Primary Examiner* — Sarah Su
(74) *Attorney, Agent, or Firm* — Leydig, Voit & Mayer, Ltd.

(57) ABSTRACT

In some instances, the disclosure provides a method for identifying access anomalies using network graphs. The method comprises obtaining access data for an entity, generating a network graph baseline profile based on the plurality of data elements, generating a network graph current profile based on the plurality of data elements, generating comparison data based on comparing the plurality of baseline network graphs with the one or more current network graphs and comparing the plurality of baseline nodes and the plurality of baseline edges with the plurality of current nodes and the plurality of current edges, determining, based on the comparison data, anomaly data comprising one or more flagged network accesses to the enterprise system, and providing the anomaly data indicating the flagged network accesses to an authentication system.

20 Claims, 10 Drawing Sheets

(51) Int. Cl.
*H04L 41/069* (2022.01)
*G06F 18/214* (2023.01)

(52) U.S. Cl.
CPC ............ *H04L 41/069* (2013.01); *H04L 63/08* (2013.01); *H04L 63/1416* (2013.01)

(58) Field of Classification Search
CPC ..... H04L 41/145; H04L 41/12; H04L 41/142; H04L 41/22; G06F 18/214; G06F 18/29; G06N 20/00; G06N 3/08
See application file for complete search history.

(56) References Cited

U.S. PATENT DOCUMENTS

| | | | | |
|---|---|---|---|---|
| 11,205,128 | B2* | 12/2021 | Soong | G06Q 50/01 |
| 11,503,054 | B2* | 11/2022 | Furtak | G06F 18/29 |
| 2007/0226796 | A1 | 9/2007 | Gilbert et al. | |
| 2008/0109730 | A1* | 5/2008 | Coffman | G06Q 30/02 715/733 |
| 2010/0287128 | A1* | 11/2010 | Baltatu | G06F 18/2433 709/224 |
| 2016/0219066 | A1* | 7/2016 | Vasseur | H04L 63/1458 |
| 2018/0225372 | A1* | 8/2018 | Lecue | G06F 16/36 |
| 2018/0330253 | A1 | 11/2018 | Gottschlich et al. | |
| 2019/0121979 | A1* | 4/2019 | Chari | G06F 21/566 |
| 2019/0222597 | A1* | 7/2019 | Crabtree | H04L 43/045 |
| 2019/0327330 | A1* | 10/2019 | Natarajan | H04L 67/306 |
| 2019/0364065 | A1 | 11/2019 | Saraf et al. | |
| 2020/0104518 | A1 | 4/2020 | Parker | |
| 2020/0220892 | A1* | 7/2020 | Gibson | H04L 63/1441 |
| 2020/0358796 | A1 | 11/2020 | Kundu et al. | |
| 2021/0194907 | A1 | 6/2021 | Bertiger et al. | |
| 2022/0014571 | A1 | 1/2022 | Polish et al. | |
| 2023/0053182 | A1* | 2/2023 | Bertiger | H04L 63/1425 |

FOREIGN PATENT DOCUMENTS

| | | | | |
|---|---|---|---|---|
| CN | 112087452 A | * | 12/2020 | ......... G06K 9/6256 |
| JP | 2018073140 A | * | 5/2018 | ............ H04L 41/08 |
| WO | WO 2019/204778 A1 | | 10/2019 | |
| WO | WO-2019184137 A1 | * | 10/2019 | ............ H04L 63/02 |
| WO | WO-2020046260 A1 | * | 3/2020 | |

OTHER PUBLICATIONS

U.S. Appl. No. 16/810,765, filed Mar. 5, 2020.
Denning, Dorothy E., "An Intrusion-Detection Model," *IEEE Transactions on Software Engineering*, vol. SE-13, No. 2, 222-232 (Feb. 1987).
Eberle et al., "Insider Threat Detection Using a Graph-Based Approach," *Journal of Applied Security Research*, 6 (1) (Dec. 2010).

* cited by examiner

SYSTEMS AND METHODS FOR IDENTIFYING ACCESS ANOMALIES USING NETWORK GRAPHS

CROSS-REFERENCE TO RELATED APPLICATIONS

This patent application claims the benefit of U.S. patent application Ser. No. 16/810,765, filed Mar. 5, 2020, which is incorporated by reference herein.

BACKGROUND

Cybersecurity is a growing concern for numerous enterprise organizations. For example, each day, there are numerous fraudulent attempts to access private and sensitive data stored on the network servers of the enterprise organization. However, enterprise organizations also seek to have the flexibility to permit their employees to work remotely. By being remote, it is difficult for the enterprise organization to determine whether the person accessing their information is an authorized user or an illicit source. For instance, an illicit source may attempt to access the private data by performing actions that are as close as possible to the authorized user as possible. As such, there exists a need for a technical solution to protect against unauthorized accesses.

SUMMARY

In some instances, the disclosure provides a method for identifying access anomalies using network graphs. The method is performed by a data storage and access system associated with an enterprise system. The method comprises obtaining access data for an entity. The access data comprises a plurality of access entries associated with network elements the entity uses to access the enterprise system and each of the plurality of access entries comprises a plurality of data elements. The method further comprises generating a network graph baseline profile based on the plurality of data elements. The network graph baseline profile comprises a plurality of baseline network graphs and each network graph comprises a plurality of baseline nodes and a plurality of baseline edges. The method further comprises generating a network graph current profile based on the plurality of data elements. The network graph current profile comprises one or more current network graphs. The one or more current network graphs comprise a plurality of current nodes and a plurality of current edges. Each of the plurality of baseline network graphs and the one or more current network graphs are associated with an access entry from the plurality of access entries. The method further comprises generating comparison data based on comparing the plurality of baseline network graphs with the one or more current network graphs and comparing the plurality of baseline nodes and the plurality of baseline edges with the plurality of current nodes and the plurality of current edges. The method further comprises determining, based on the comparison data, anomaly data comprising one or more flagged network accesses to the enterprise system. The method further comprises providing the anomaly data indicating the flagged network accesses to an authentication system.

In other instances, the disclosure provides a data storage and access system associated with an enterprise system. The data storage and access system associated with an enterprise system comprises a processor and non-transitory computer-readable medium having processor-executable instructions stored thereon. The processor-executable instructions, when executed, facilitate comprises obtaining access data for an entity. The access data comprises a plurality of access entries associated with network elements the entity uses to access the enterprise system and each of the plurality of access entries comprises a plurality of data elements. The processor-executable instructions, when executed, further facilitate generating a network graph baseline profile based on the plurality of data elements. The network graph baseline profile comprises a plurality of baseline network graphs and each network graph comprises a plurality of baseline nodes and a plurality of baseline edges. The processor-executable instructions, when executed, further facilitate generating a network graph current profile based on the plurality of data elements. The network graph current profile comprises one or more current network graphs. The one or more current network graphs comprise a plurality of current nodes and a plurality of current edges. Each of the plurality of baseline network graphs and the one or more current network graphs are associated with an access entry from the plurality of access entries. The processor-executable instructions, when executed, further facilitate generating comparison data based on comparing the plurality of baseline network graphs with the one or more current network graphs and comparing the plurality of baseline nodes and the plurality of baseline edges with the plurality of current nodes and the plurality of current edges. The processor-executable instructions, when executed, further facilitate determining, based on the comparison data, anomaly data comprising one or more flagged network accesses to the enterprise system. The processor-executable instructions, when executed, further facilitate providing the anomaly data indicating the flagged network accesses to an authentication system.

In yet other instances, the disclosure provides a non-transitory computer-readable medium having processor-executable instructions stored thereon. The processor-executable instructions, when executed, facilitate comprises obtaining access data for an entity. The access data comprises a plurality of access entries associated with network elements the entity uses to access the enterprise system and each of the plurality of access entries comprises a plurality of data elements. The processor-executable instructions, when executed, further facilitate generating a network graph baseline profile based on the plurality of data elements. The network graph baseline profile comprises a plurality of baseline network graphs and each network graph comprises a plurality of baseline nodes and a plurality of baseline edges. The processor-executable instructions, when executed, further facilitate generating a network graph current profile based on the plurality of data elements. The network graph current profile comprises one or more current network graphs. The one or more current network graphs comprise a plurality of current nodes and a plurality of current edges. Each of the plurality of baseline network graphs and the one or more current network graphs are associated with an access entry from the plurality of access entries. The processor-executable instructions, when executed, further facilitate generating comparison data based on comparing the plurality of baseline network graphs with the one or more current network graphs and comparing the plurality of baseline nodes and the plurality of baseline edges with the plurality of current nodes and the plurality of current edges. The processor-executable instructions, when executed, further facilitate determining, based on the comparison data, anomaly data comprising one or more flagged network accesses to the enterprise system. The processor-executable instructions, when executed, further facilitate providing the anomaly data indicating the flagged network accesses to an authentication system.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Embodiments of the presented invention will now be described more fully hereinafter with reference to the accompanying FIGs., in which some, but not all, embodiments of the invention are shown. Indeed, the invention may be embodied in any different forms and should not be construed as limited to the embodiments set forth herein; rather, these embodiments are provided so that the disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more" even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on".

Figure 1:
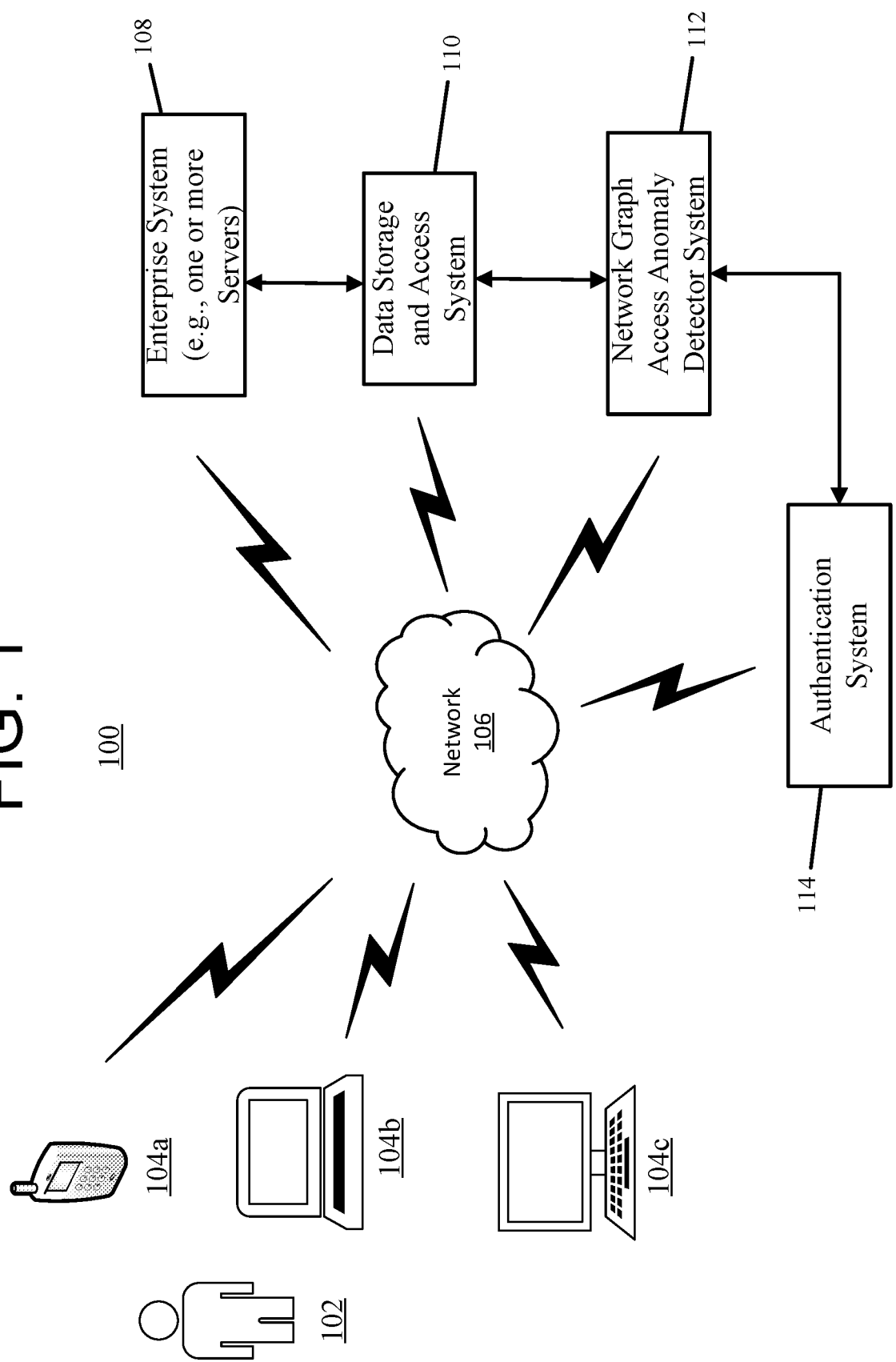
FIG. 1 is a simplified block diagram depicting an exemplary computing environment in accordance with one or more exemplary embodiments of the present application.

Systems, methods, and computer program products are herein disclosed that provide for identifying access anomalies using network graphs. FIG. 1 is a simplified block diagram depicting an exemplary environment in accordance with an exemplary embodiment of the present application. The environment 100 includes an entity 102 (e.g., a user) and multiple systems including an enterprise system 108, a data storage and access system 110, a network graph access anomaly detector system 112, an authentication system 114, and entity computing systems 104a through 104c. As used herein, the systems within the environment 100 include one or more devices, servers, network elements, and/or other types of computing devices.

The systems within the environment 100 may be operatively coupled (e.g., in communication with) other systems within the environment 100 via the network 106. The network 106 may be a global area network (GAN) such as the Internet, a wide area network (WAN), a local area network (LAN), or any other type of network or combination of networks. The network 106 may provide a wireline, wireless, or a combination of wireline and wireless communication between the systems and/or other components within the environment 100.

Entity 102 may be one or more associates, employees, agents, contractors, sub-contractors, third-party representatives, unauthorized user, and/or other types of users attempting/accessing the enterprise system 108. For example, the entity 102 (e.g., a user) may access the enterprise system 108 using the network 106. The entity 102 may use one or more entity computing systems 104a through 104c to access the enterprise system 108. Entity computing systems 104a through 104c include, but are not limited to, a desktop, laptop, tablet, mobile device (e.g., smartphone device, or other mobile device), or any other type of computer that generally comprises one or more communication components, one or more processing components, and one or more memory components. While only three entity computing systems 104a through 104c are shown in environment 100, in some instances, the environment 100 may include additional or less than three entity computing systems 104a through 104c. Furthermore, in some examples, a different entity (e.g., an unauthorized user) may use an entity computing system (e.g., the entity computing system 104c) to access the enterprise system 108.

The enterprise system 108 includes one or more computing devices such as one or more servers that are used for performing tasks, functions, and/or other actions for an enterprise organization. The enterprise organizations may be a corporation, company, organization, and/or other institution. In some instances, the enterprise system 108 may, for example, create, store, manipulate, manage, provide access to, and/or otherwise maintain enterprise information. The entity 102 may use the entity computing systems 104a through 104c to access the enterprise system to perform tasks for the enterprise organization.

The enterprise system 108 is operatively coupled and/or communicates (e.g., directly and/or indirectly) with a data storage access system 110. The data storage access system 110 includes memory capable of storing information for the enterprise organization. For example, the system 110 may include a database. In another example, the data storage access system 110 may include a big data database system having distributed storage across a plurality of computing nodes. When an entity 102 seeks to access the enterprise system 108, the associated entity computing system (e.g., 104a or 104b) provides access data such as the credentials of the entity 102 to the enterprise system 108. The enterprise system 108 provides the access data to the data storage and access system 110 and the data storage and access system 110 stores the access data. In some variations, the associated entity computing system bypasses the enterprise system 108 and communicates directly with the data storage and access system 110. In other words, the data storage and access system 110 receives the access data from the associated entity computing system via the network 106.

The network graph access anomaly detector system (detector system) 112 is operatively coupled and/or communicates with the data storage and access system 110. The detector system 112 includes one or more computing devices capable of identifying network anomalies. For instance, the detector system 112 may include a server, a personal computer, or other device with processing and communication capabilities, or may include a computing system comprising a plurality of computing nodes (such as a big data processing system in which processing functionality is distributed across a plurality of nodes). The detector system 112 obtains information such as the access data from the data storage and access system 110. As will be explained below, the detector system 112 determines anomaly data such as potential unauthorized network accesses by the entity 102 using the access data. The detector system 112 provides the anomaly data to the authentication system 114.

The authentication system 114 includes one or more computing devices capable of authenticating the anomaly data. For example, the authentication system 114 may include one or more devices, servers, and/or other apparatuses capable of authenticating whether anomalies from the anomaly data indicate an authorized access to the enterprise system 108.

In an exemplary implementation, the enterprise system 108, the data storage and access system 110, the detector system 112, and/or the authentication system 114 may all be associated with a single enterprise organization (e.g., a same organization or institution), and may be interconnected via an internal network of that enterprise organization via wired connections and/or wireless connections. In another exemplary implementation, one or more of the enterprise system 108, the data storage and access system 110, the detector system 112, and/or the authentication system 114 may be operated by a separate institution relative to the enterprise organization. For example, the enterprise system 108, the detector system 112, and the authentication system 114 may be operated by a first enterprise organization and the data storage and access system 110 may be operated by a second enterprise organization.

It will be appreciated that the exemplary system depicted in FIG. 1 is merely an example, and that the principles discussed herein may also be applicable to other situations—for example, including other types of institutions, organizations, devices, systems, and network configurations. For example, in another configuration, one or more of the enterprise system 108, the detector system 112, the data storage and access system 110, and the authentication system 114 may be incorporated within a single system. For instance, the enterprise system 108 may comprise the detector system 112 and the authentication system 114.

Figure 2:
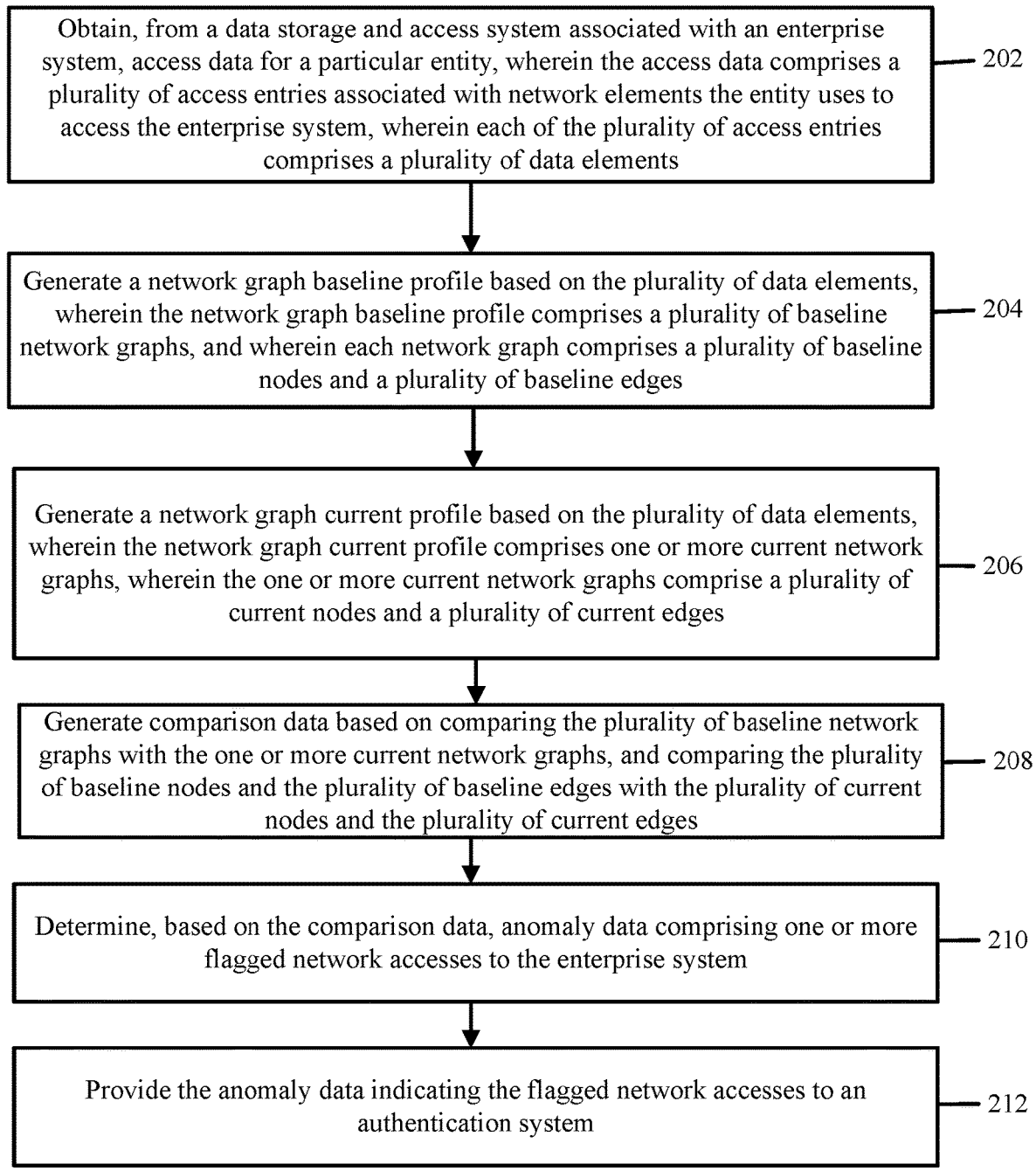
FIG. 2 is a flowchart illustrating an exemplary process for identifying network anomalies and/or unauthorized network accesses using network graphs in accordance with one or more exemplary embodiments of the present application.

FIG. 2 is a flowchart illustrating an exemplary process 200 for identifying network anomalies and/or unauthorized network accesses using network graphs in accordance with one or more exemplary embodiments of the present application. The process 200 may be performed by the environment 100; however, it will be recognized that any suitable environment may be used and that any of the following blocks may be performed in any suitable order. FIG. 2 will be described with reference to FIGS. 3-9. However, the descriptions, illustrations, and processes from FIGS. 3-9 are merely exemplary and the process 200 may use other descriptions, illustrations, and processes to identify network anomalies and/or unauthorized network accesses using network graphs.

At block 202, the detector system 112 obtains, from the data storage and access system 110 associated with an enterprise system 108, access data for a particular entity 102. The access data may include a plurality of access entries associated with network elements the entity 102 uses to access the enterprise system 108. Each of the plurality of access entries may include a plurality of data elements.

Figure 3:
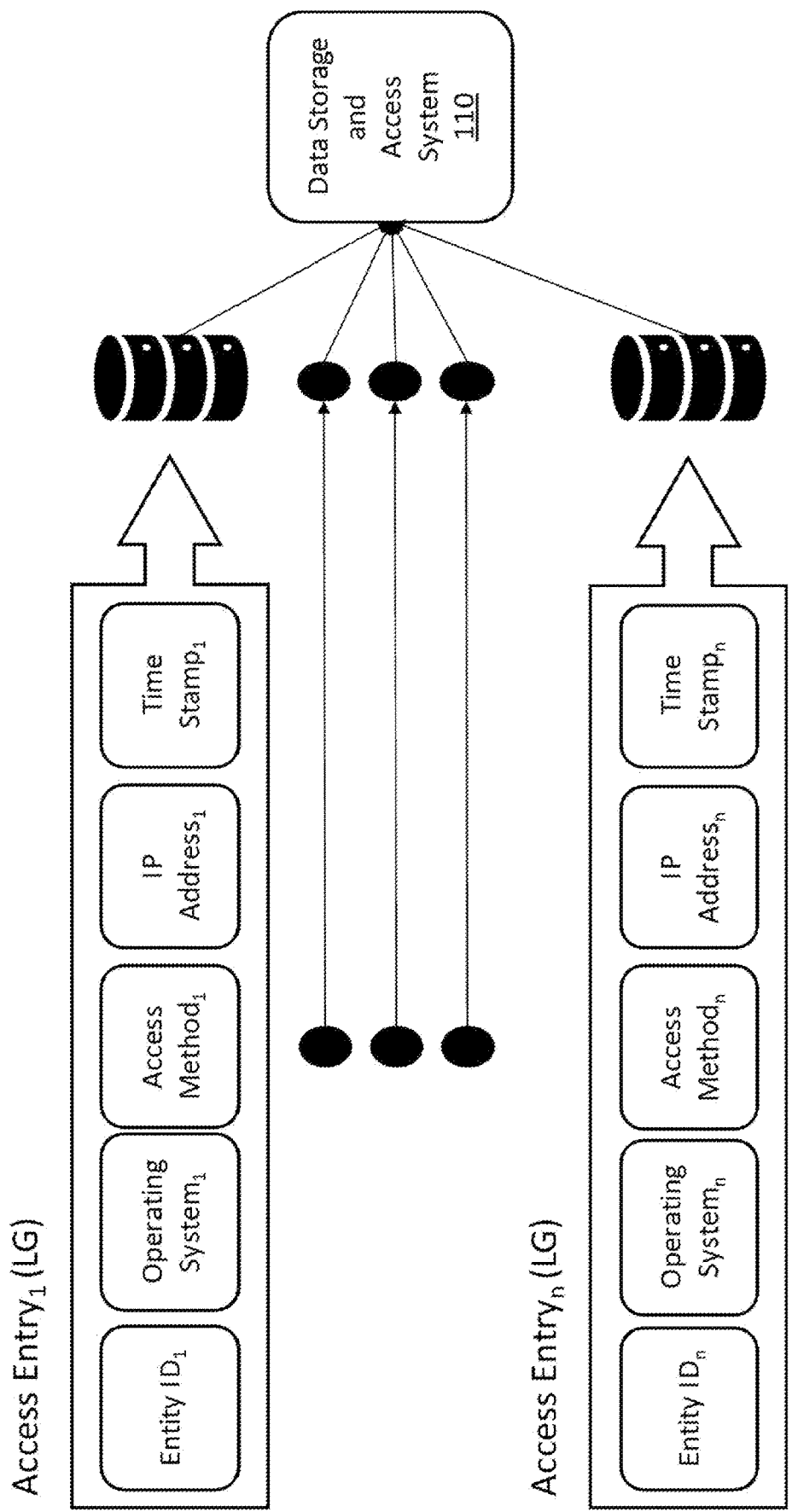
FIG. 3 is an illustration of access entries stored within a data storage and access system in accordance with one or more exemplary embodiments of the present application.

For example, the entity 102 (e.g., user) uses an entity computing system such as entity computing system 104a to access (e.g., create, store, manipulate, manage, retrieve, log-in and/or otherwise interact with) the enterprise system 108. To access the enterprise system 108, the entity computing system 104a provides information such as credentials and/or other data to the enterprise system 108. The data storage and access system 110 receives the information such as access data from the entity computing system 104a via the network 106 and/or from the enterprise system 108. The data storage and access system 110 stores the access data into memory. FIG. 3 shows an exemplary data storage and access system 110 and the stored access data.

Referring to FIG. 3, the access data may be stored as separate access entries. For example, for each instance the entity 102 accesses the enterprise system 108, the data storage and access system 110 may store an access entry. The access entries are associated with network elements or identifiers the entity 102 uses to access the enterprise system 108. For example, each access entry may include a plurality of data elements such as, but not limited to, an entity identifier, an operating system, an access method, and internet protocol (IP) address, and/or a time stamp.

The entity identifier may indicate the entity (e.g., user). For example, the user may use a user log-in or email, which may be the entity identifier. The operating system may indicate the operating system of the entity computing system used to access the enterprise system 108. The access method may indicate a method (e.g., a virtual private network (VPN), CITRIX application, and/or other methodologies or applications) used by the entity computing system to access the enterprise system 108. The IP address may be the IP address of the entity computing system. The time stamp may be a time of when the entity computing system accesses the enterprise system 108.

In other words, each time a user attempts to and/or accesses the enterprise system 108, the data storage and access system 110 may obtain an access entry. The access entry includes information (e.g., data elements) associated with the access. The data storage and access system 110 stores the access entries for the entity within memory.

Referring back to FIG. 2, the detector system 112 may obtain (e.g., receive and/or retrieve) the access data for the entity 102 from the data storage and access system 110. The access data may include the access entries and the associated data elements shown on FIG. 3. The detector system 112 may also retrieve the access entries over a period of time such as over a month or a year.

Additionally, and/or alternatively, the detector system 112 may separate the access entries into two or more subsets of access entries. For example, the detector system 112 may use the associated timestamp to separate access entries into a first subset of access entries (e.g., historical/baseline access entries) over a first period of time and a second subset of access entries (e.g., recent/current access entries) over a second period of time. In some instances, the first period of time may be a different length of time than the second period of time. For example, the first period of time may be a month and the second period of time may be a day. Additionally, and/or alternatively, the first and second periods of time may be immediately subsequent to one another. For example, the first period of time may be for the previous month and the second period of time may be for the day immediately after that first period of time. In some examples, the detector system 112 may first retrieve the access data over the first period of time and then retrieve the access over the second period of time.

In other words, in some variations, the access entries may be separated into two or more groups based on the time the entity accessed the enterprise system 108. The access entries within the first group (e.g., first subset) are all within a certain period such as the month of March. The access entries within the second group (e.g., second subset) are all the accesses within a time period immediately subsequent to the first time period such as April 1$^{st}$. As such, the first and second time periods may be of different lengths.

Figure 4:
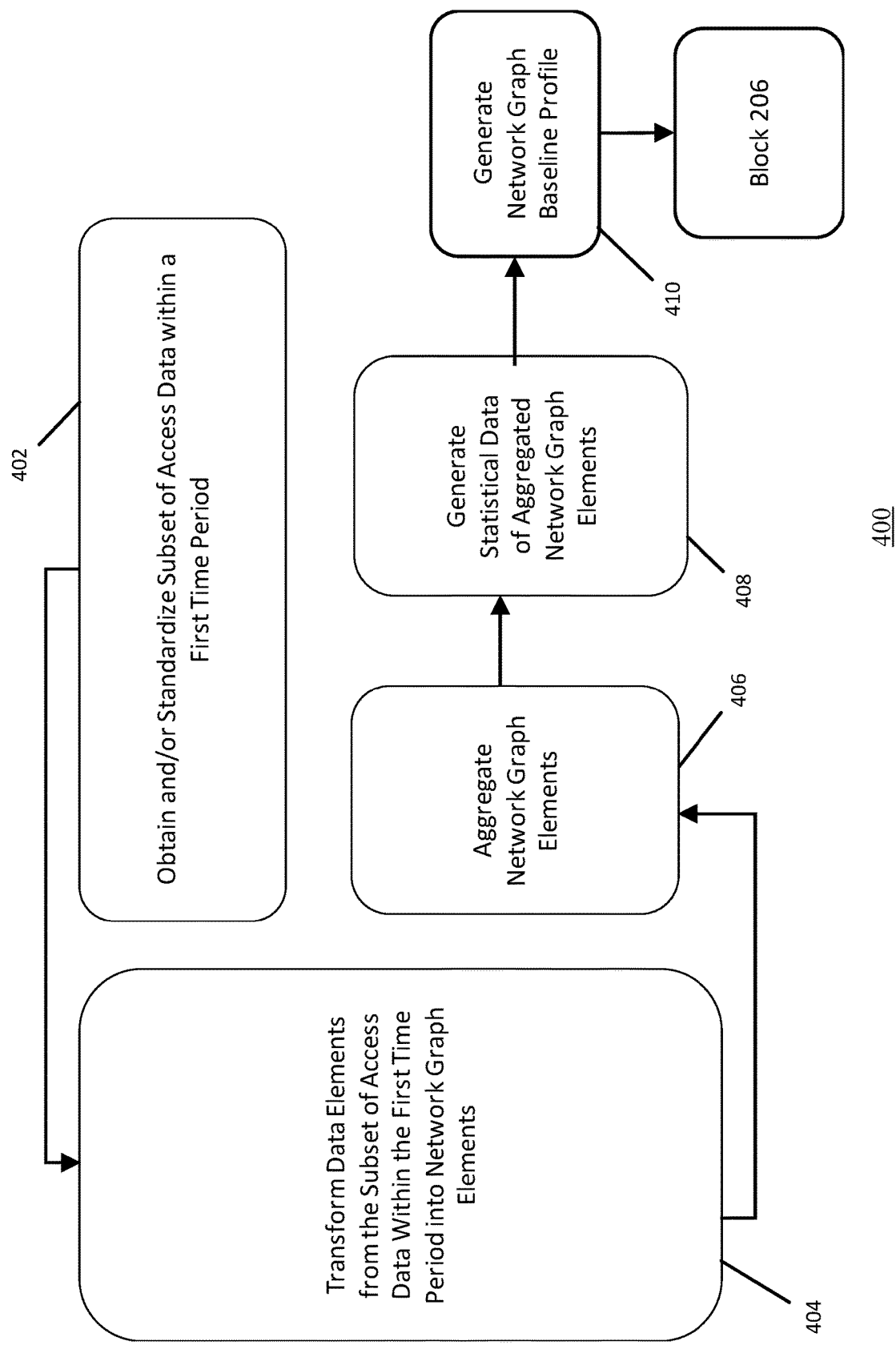
FIG. 4 is another flowchart illustrating another exemplary process for identifying network anomalies using network graphs in accordance with one or more exemplary embodiments of the present application.
Figure 5:
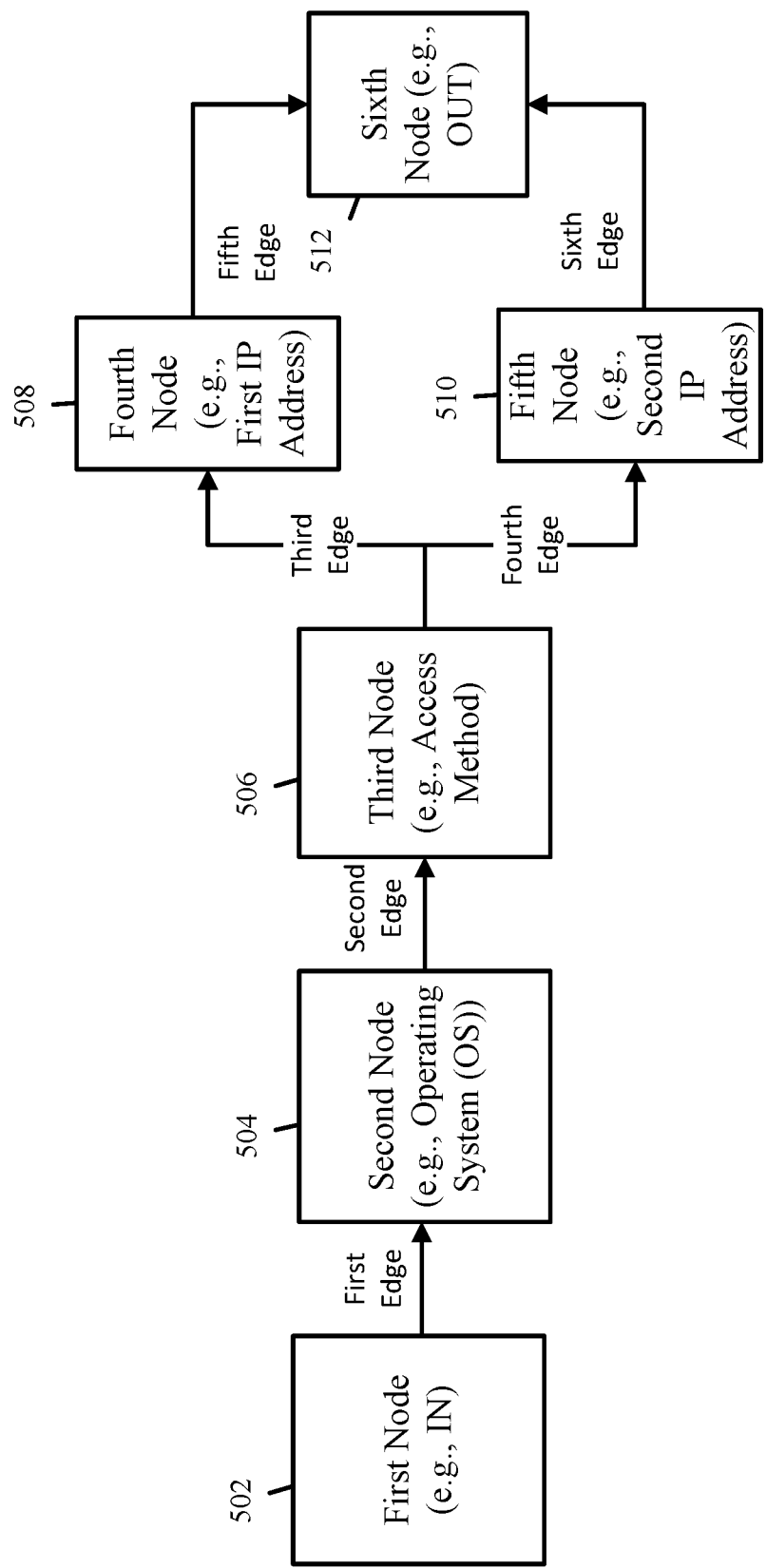
FIG. 5 is an illustration of an exemplary network graph in accordance with one or more exemplary embodiments of the present application.

At block 204, the detector system 112 generates a network graph baseline profile based on the plurality of data elements from the access data. The network graph baseline profile includes a plurality of baseline network graphs and each network graph comprises a plurality of baseline nodes and a plurality of baseline edges. For example, using the data elements (e.g., the entity identifier, the operating system, the access method, and the IP address, and/or the time stamp) from the first subset of access entries (i.e., the historical or baseline access entries from the first period in time), the detector system 112 generates the network graph baseline profile. FIGS. 4 and 5 describe blocks 202 and 204, including generating the network graph baseline profile, in more detail.

FIG. 4 shows an exemplary process 400 for generating the network graph baseline profile. Referring to FIG. 4, at block 402, the detector system 112 obtains and/or standardizes a subset of the access data (e.g., the first subset of access data) that is within a first time period such as thirty days. For example, the detector system 112 obtains (e.g., determines, separates, retrieves, and/or receives) the access data for the previous thirty days (e.g., March) from the data storage and access system 110. After, the detector system 112 standardizes the access data to ensure the data elements within each access entry matches. For instance, the formatting of the timestamp for each data element may be slightly different (e.g., some might not include the seconds whereas others include the seconds). The detector system 112 may standardize to the access entries so none of the access entries includes the seconds.

As described above, the first subset of access entries in the first period of time may be shown as:

For time interval $i$ where $i > 1$
$^{1}_{LG}(ID, OS, AM, IP, TS)_{[1,i]}$
$^{n}_{LG}(ID, OS, AM, IP, TS)_{[1,i]}$ where ID is the entity identifier, OS is operating system, AM is access method, IP is IP address, TS is timestamp, n is the number of entries, LG is the access entry, and i is a time interval.

At block 404, the detector system 112 transforms the data elements from the subset of access data within the first time period into network graph elements (e.g., baseline network graphs). The network graph elements may include multiple different baseline network graphs from the first subset of access entries. Network graphs may be mathematical structures used to study pairwise relationships between different objects (i.e., nodes). Network graphs may provide a better way of dealing with relationships and interactions within the objects. For instance, a network graph may be a pair of sets (e.g., nodes and edges). The node attributes define a node based on its characteristics. The edges connect the nodes together and may be unidirectional or bidirectional.

In other words, each baseline network graph may include multiple baseline nodes and/or baseline edges. For example, for each access entry, the detector system 112 generates a baseline network graph. Within the baseline network graph, the detector system 112 transforms each data element (e.g., operating system or IP address) within the access entry into a node.

The detector system 112 also generates edges using the data elements. For example, the generated edges may indicate connections between the data elements (i.e., the nodes). For instance, the detector system 112 may assign a connection (e.g., edge) between a first data element such as access method and a second data element such as IP address. In other words, using the edges and nodes, the detector system 112 generates a baseline network graph comprising the nodes (e.g. the data elements) and the edges (e.g., the connections between the data elements). The detector system 112 may continue to generate baseline nodes and/or baseline edges for the other access entries within the first time period.

As described above, the nodes and edges may be shown as:

For graph G=(V,E)
$^{n}_{LG}(ID, OS)_{[1,i]} = ^{n}_{LG}(x,y)_{[1,i]} = E$
$^{n}_{LG}(OS, AM)_{[1,i]} = ^{n}_{LG}(x,y)_{[1,i]} = E$
$^{n}_{LG}(AM, IP)_{[1,i]} = ^{n}_{LG}(x,y)_{[1,i]} = E$
$^{n}_{LG}(IP, TS)_{[1,i]} = ^{n}_{LG}(x,y)_{[1,i]} = E$
$^{n}_{LG}(ID, OS, AM, IP, TS)_{[1,i]}$
=
$^{n}_{LG}(V_{ID}, V_{OS}, V_{AM}, V_{IP}, V_{TS})_{[1,i]}$ where ID is the entity identifier, OS is operating system, AM is access method, IP is IP address, TS is timestamp, n is the number of entries, LG is the access entry, E is edge, i is a time interval, $V_{id}$ is vector id (i.e., node id), $V_{os}$ is vector OS (i.e., node OS), $V_{am}$ is vector access method (i.e., node access method), $V_{ip}$ is vector IP (i.e., node IP address), and $V_{ts}$ is vector time stamp (i.e., node time stamp).

At block 406, the detector system 112 may aggregate the network graph elements (i.e., the nodes and edges of the baseline network graphs). For example, the detector system 112 may generate baseline network graphs for the entire first period of time (e.g., March). Then, the detector system 112 may aggregate or combine the baseline network graphs/network graph elements for the entire first period of time.

FIG. 5 shows an exemplary aggregation of network graph elements/baseline network graphs and will be used to describe network graphs in more detail. Referring to FIG. 5, the detector system 112 transforms each of the data elements into the nodes 502, 504, 506, 508, 510, and 512. The detector system 112 also generates edges or connections between each of the nodes. As shown, the entity 102 uses two different IP addresses (e.g., a first IP address in node 508 and a second IP address in node 510) to access the enterprise system 108. For example, at a first instance in time (e.g., the previous Monday), the entity 102 uses a first operating system (e.g., a MAC computer), a first access method (e.g., a VPN), and a first IP address to access the enterprise system 108. Then, at a second instance in time (e.g., the previous Tuesday), the entity 102 uses the first operating system (e.g., a MAC computer), the first access method (e.g., a VPN), and a second IP address to access the enterprise system 108. At a third instance in time (e.g., the previous Wednesday), the entity 102 uses the first operating system (e.g., a MAC computer), the first access method (e.g., a VPN), and the first IP address to access the enterprise system 108. The detector system 112 combines and aggregates these network graphs together to generate the example shown in FIG. 5. The nodes may include a count and/or otherwise indicate the number of times the entity 102 uses it to access the enterprise system 108 (e.g., fourth node 508 indicates 2 counts and fifth node 510 indicates 1 count).

FIG. 5 is an exemplary aggregation of baseline network graphs and in some instances, the aggregated baseline network graphs may be more complex. For example, over the first period of time, the entity 102 may access the enterprise system 108 numerous times, including hundreds or thousands times. As such, the aggregated baseline network graphs may include numerous nodes and edges identifying numerous data elements or network paths used by the entity 102 to access the enterprise system 108 over the period of time.

As described above, the summation of the baseline network graphs may be shown as:

$\Sigma^n_{LG} x, y_{[1,i]}$
$\Sigma^n_{LG}(V_{ID,OS,AM,IP,TS})_{[1,i]}$ where $\Sigma$ shows the summation of the edges and nodes.

Referring back to FIG. 4, at block 408, the detector system 102 generates statistical data (e.g., attributes/characteristics) of the aggregated network graph elements. For example, the detector system 102 determines statistical data for each edge, each node, each type/category of node, and/or each type/category of edge from the aggregated baseline network graphs. For instance, the detector system 102 may generate statistical data for each of the edges. The statistical data for each of the edges corresponds to the statistical data for the entity 102 using the connection between the nodes (e.g., the frequency between a particular OS to a particular Access Method or between the particular Access Method to a first IP address). Additionally, and/or alternatively, the detector system 102 may generate statistical data for each category of edges (e.g., OS to Access Method or Access Method to IP address). Additionally, and/or alternatively, similarly, the detector 102 may generate statistical data for the nodes and/or categories of nodes.

In some examples, the detector system 102 may determine statistical data including, but not limited to, time interval frequency, frequency mean, frequency median, frequency standard deviation, frequency deviation from mean, positive deviation binary indicator, negative deviation binary indicator, frequency range, frequency minimum, frequency maximum, percent to range, quartile, decile, percentile distribution density, frequency rate of change, and/or frequency projected change. Additionally, and/or alternatively, the detector system 102 may also determine statistical data including, but not limited to, aggregation of the edge statistics for each node, node Jaccard Similarity (JS), the edge statistics applied to the JS and/or Markov statistics.

At block 410, the detector system 102 generates the network graph baseline profile comprising the baseline network graphs including the generated nodes, the generated edges, the aggregated network graphs, and/or the statistical data for the network graphs. In other words, the network graph baseline profile includes the aggregated baseline nodes and baseline edges from multiple different network graphs generated from the access entries within the first time period (e.g., March). The network graph baseline profile also includes the generated statistical data from block 408 such as the statistical data for the edges and/or category of edges. Then, the process 400 moves to block 206.

Figure 6:
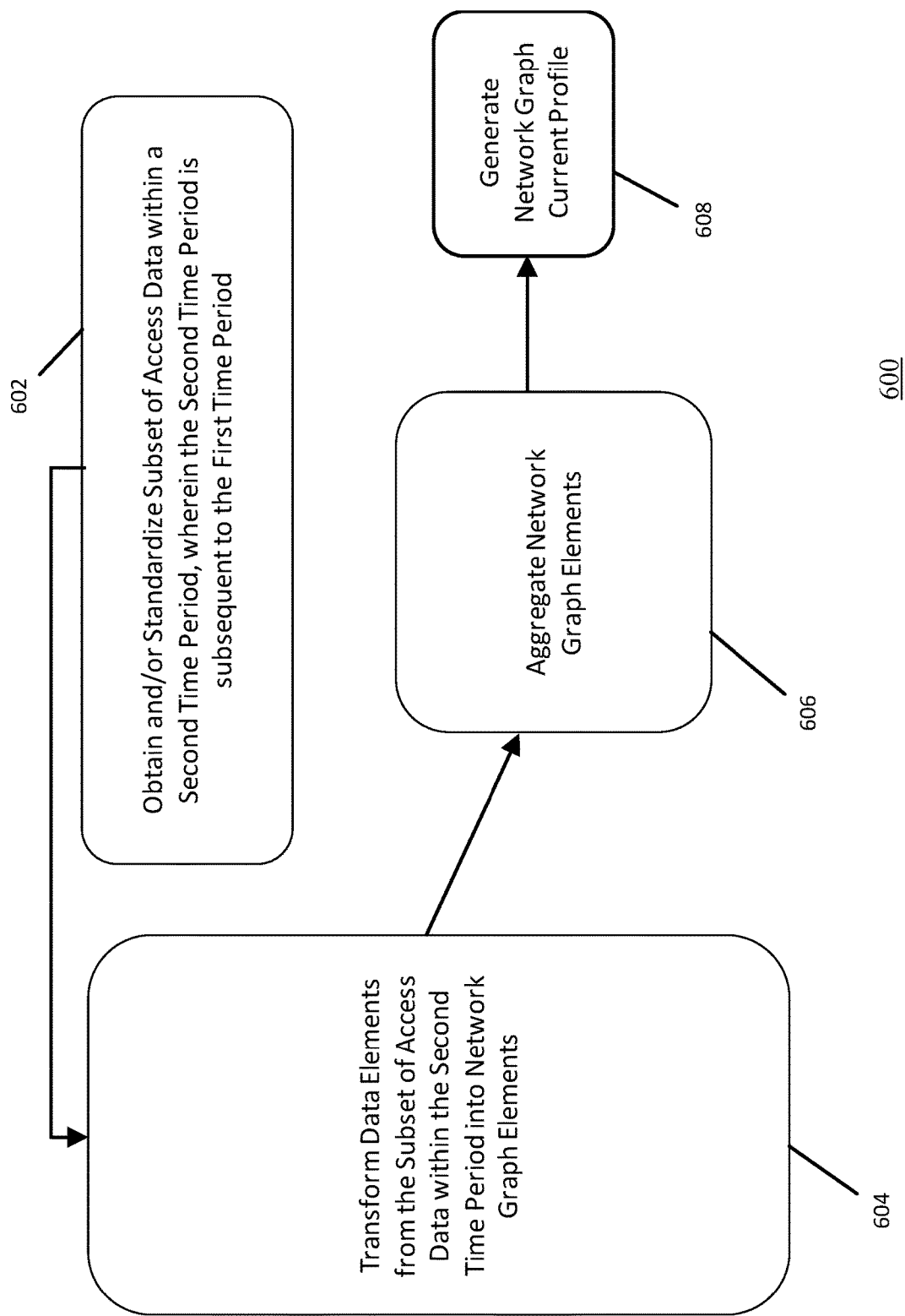
FIG. 6 is another flowchart illustrating another exemplary process for identifying network anomalies using network graphs in accordance with one or more exemplary embodiments of the present application.

Referring back to FIG. 2, at block 206, the detector system 102 generates a network graph current profiled based on the plurality of data elements. The network graph current profile comprises one or more current network graphs. The one or more current network graphs include a plurality of current nodes and a plurality of current edges. For example, using the data elements (e.g., the entity identifier, the operating system, the access method, and the IP address, and/or the time stamp) from the second subset of access entries (i.e., the current or recent access entries from the second period in time), the detector system 112 generates the network graph current profile. As mentioned above, in some instances, the current or recent access entries are from a period of time immediately subsequent to the first period of time (e.g., if the first time period is March, then the second time period is April 1st). FIG. 6 shows an exemplary process 600 for generating the network graph current profile and describes blocks 202 and 206 in more detail.

Referring to FIG. 6, at block 602, the detector system 112 obtains and/or standardizes a subset of access data (e.g., the second subset of access data) that is within a second time period. The second subset of access data may include one or more access entries. The second time period is subsequent to the first time period. For example, the detector system 112 obtains the access data for the current and/or recent time period for the entity 102 from the data storage and access system 110. After, the detector system 112 standardizes the access data. In some examples, at block 602, the detector system 112 standardizes the subset of access data (e.g., the second subset of access data) in the same way the detector system 112 standardizes the first subset of access data at block 402.

As described above, the second subset of access entries in the second period of time may be shown as:

For time t where t=i+1

$^{ID\ 1}_{LG}(ID, OS, AM, IP, TS)_t$ $^{ID\ n}_{LG}(ID, OS, AM, IP, TS)_t$ where ID is the entity identifier, OS is operating system, AM is access method, IP is IP address, TS is timestamp, n is the number of entries, LG is the access entry, and i is a time interval.

At block 604, the detector system 112 transforms data elements from the subset of access data within the second time period into network graph elements (e.g., current network graphs). For example, similar to block 404, the detector system 112 transforms the data elements from the second subset of access data into current network graphs that include the nodes and edges. The nodes are associated with the individual data elements from the access entries and the edges are associated with the connection between the data elements.

As described above, the current nodes and current edges may be shown as:

For graph $G_{ID}=(V,E)_{ID}$ $^{ID\ n}_{LG}(ID, OS)_{[1,i]} = n_{LG}(x,y)_t = E$
$^{ID\ n}_{LG}(OS, AM)_{[1,i]} = n_{LG}(x,y)_t = E$
$^{ID\ n}_{LG}(AM, IP)_{[1,i]} = n_{LG}(x,y)_t = E$
$^{ID\ n}_{LG}(IP, TS)_{[1,i]} = n_{LG}(x,y)_t = E$
$^{ID\ n}_{LG}(ID, OS, AM, IP, TS)_t$
=
$^{ID\ n}_{LG}(V_{ID}, V_{OS}, V_{AM}, V_{IP}, V_{TS})_t$ where ID is the entity identifier, OS is operating system, AM is access method, IP is IP address, TS is timestamp, n is the number of entries, LG is the access entry, E is edge, i is a time interval, $V_{id}$ is vector id (i.e., node id), $V_{os}$ is vector OS (i.e., node OS), $V_{am}$ is vector access method (i.e., node access method), $V_{ip}$ is vector IP (i.e., node IP address), and $V_{ts}$ is vector time stamp (i.e., node time stamp).

At block 606, similar to block 406, the detector system 112 aggregates the network graph elements. For example, the detector system 112 may aggregate or combine the current nodes and current edges from the one or more current network graphs for the second subset of access data. In some examples, after aggregating the network graph elements, the detector system 112 determines statistical data for the current nodes and edges such as a frequency count (e.g., number of different OS, count of OS) and/or deviation from the mean.

As described above, the summation of the current network graphs may be shown as:

$\Sigma^n_{LG} \text{\textbf{E,V}}_{[1,i]}$
$\Sigma^n_{LG}(V_{ID,OS,AM,IP,TS})_{[1,i]}$ where $\Sigma$ shows the summation of the edges and nodes.

At block 608, similar to block 410, the detector system 112 generates the network graph current profile comprising the generated nodes, the generated edges, the aggregated network graphs, and/or the statistical data. In other words, the network graph current profile includes the aggregated current nodes and current edges from the multiple different current network graphs generated from the access entries within the second time period (e.g., April 1st). Then, the process 600 moves to block 208.

Figure 7:
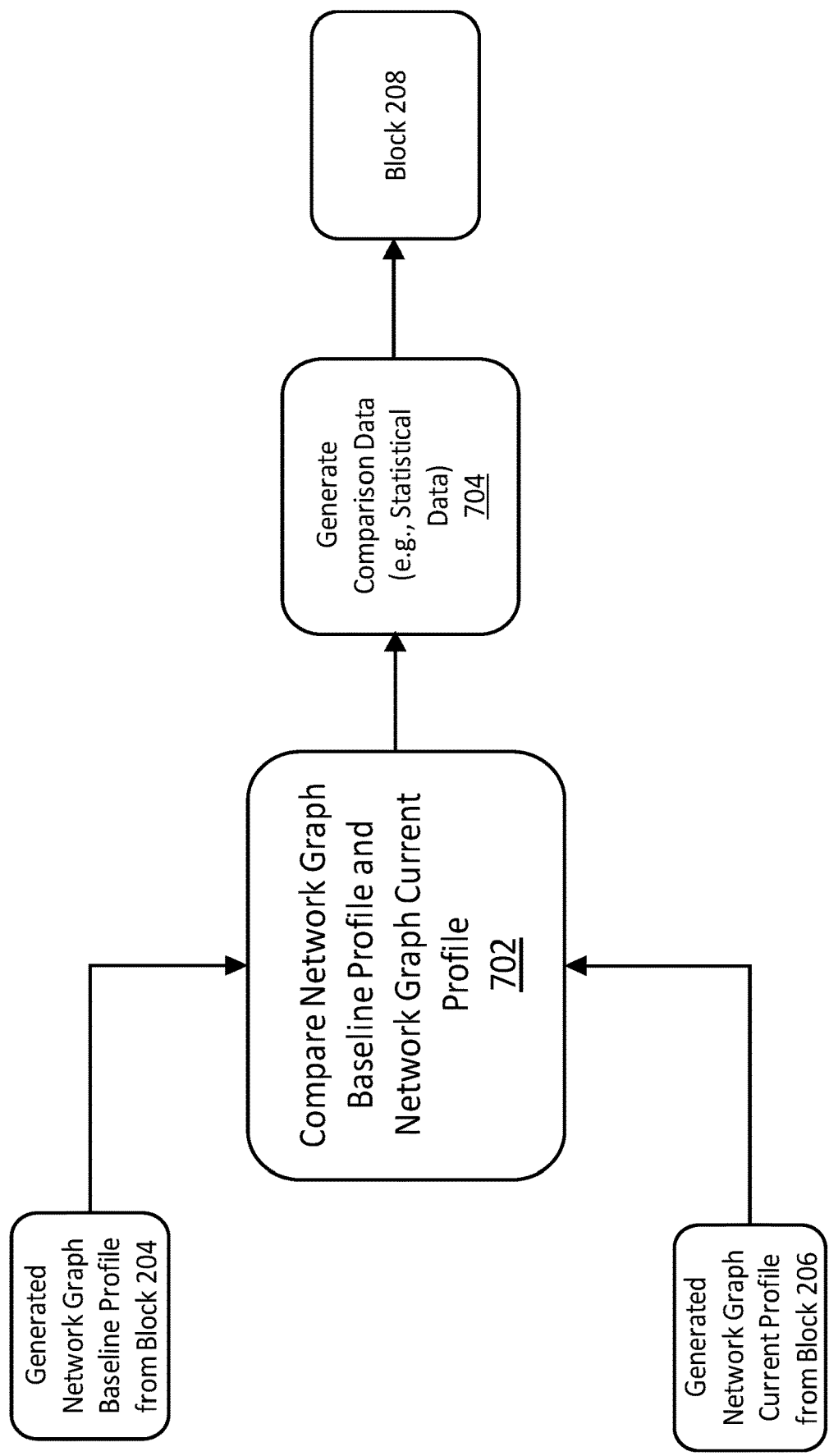
FIG. 7 is another flowchart illustrating another exemplary process for identifying network anomalies using network graphs in accordance with one or more exemplary embodiments of the present application.

Referring back to FIG. 2, at block 208, the detector system 112 generates comparison data by comparing the plurality of baseline network graphs with the one or more current network graphs and by comparing the plurality of baseline nodes and the baseline edges with the plurality of current nodes and the plurality of current edges. FIG. 7 shows an exemplary process 700 for generating comparison data and describes block 208 in more detail.

Referring to FIG. 7 and as mentioned above at block 204, the detector system 112 generates the network graph baseline profile. The network graph baseline profile includes multiple baseline network graphs for the first subset of access entries and statistical data associated with the first subset of access entries. As described above at block 206, the detector system 112 generates the network graph current profile including one or more current network graphs for the second subset of access entries.

At block 702, the detector system 112 compares the network graph baseline profile and the network graph current profile using intrusion detection expert system (IDES) and graph based anomaly detection (GBAD). GBAD statistics describe the structure of the graph and the IDES statistics describe the individual characteristics of each piece of that structure. At block 704, the detector 112 uses the comparisons between the profiles to generate comparison data (e.g., statistical data). Then, the process 700 moves to block 208.

For example, the detector system 112 may compare the current nodes/edges with the baseline nodes/edges using IDES to generate the comparison data. IDES may be a rule-based pattern matching system that looks for abnormal patterns or anomalous activity of a system based on a single relationship between network elements or a single statistic behavior (e.g., is the number of logins for this user suspicious based on past behavior). Using IDES, the detector system 112 may identify anomalies within the individual nodes and/or edges and use the statistical data for the individual nodes/edges to determine attempted break-ins, masquerading or successful break-ins, penetration by legitimate users, and/or other types of abnormal accesses. IDES may rely on descriptive statistics such as standard deviation, time series models, and others.

In other words, using IDES, the detector system 112 may determine behaviors or characteristics of a singular component (e.g., edge, node and so on) and may generate IDES statistics for the singular component. For example, the IDES statistics may indicate individual statistics for each node, edge, the total nodes, and/or the total edges.

Furthermore, the detector system 112 may compare the overall baseline network graphs with the overall one or more current network graphs using graph based anomaly detection (GBAD). GBAD may be used to determine anomalies in the overall graph-based data and may include isomorphism, edge/node count, and so on. For example, GBAD may be used to determine normative patterns of activity and detect deviations or anomalous behavior from analyzing the entire network graph.

In other words, using GBAD, the detector system 112 may describe a network of things (graph) and/or generate GBAD statistics for the entire graph such as the total number of nodes or edges (e.g., size of the graph) and the mathematical shape of the graph. For instance, GBAD statistics may indicate statistics relating to the total nodes, the total edges, isomorphism (a measure of two graphs being identical), and/or Jaccard similarity of graph elements (a measure of relative similarity between graphs). In some examples, the detector system 112 may generate the GBAD statistics indicating a mathematical shape of the graph based on a number of algorithms such as algorithms describing the number of changes needed to make the graphs from the profiles isomorphic, algorithms describing the density of the graphs, algorithms describing the complexity of the graphs, and so on.

In other words, the comparison data generated using IDES and GBAD may indicate anomalies and/or abnormal behavior for the entity 102 within the network graph current profile. For example, using IDES statistics, the detector system 112 may flag abnormal activity levels, identify rare or abnormal events, and/or identify new connections (e.g., edges). For instance, referring back to FIG. 5, the detector system 112 may analyze a node or a category of nodes such as the fourth node 508 and/or the fifth node 510 using IDES statistics to generate IDES statistical data. The detector system 112 may determine that in the first subset of access entries, the entity 102 always used the fourth node 508 (e.g., first IP address). Then, in the second subset of access entries, the entity 102 used the fifth node 510 (i.e., the second IP address). The detector system 112 may determine, using IDES, the likelihood of using a new IP address (i.e., the second IP address). Additionally, and/or alternatively, the detector system 112 may analyze an edge or a category of edges (e.g., third and fourth edge) using IDES statistics to generate IDES statistical data.

The detector system 112 uses GBAD to determine whether the entire network graph indicates anomalies or abnormal behavior. For example, using GBAD statistics, the detector system 112 may flag abnormal access patterns within the network graphs and/or identify low similarity between the nodes/edges for the network graphs. For instance, referring back to FIG. 5, the detector system 112 analyzes the individual network graphs such as the network paths to generate the GBAD statistics. In the first subset of access entries, the entity 102 may always use the same operating system and the same access method with the first IP address (i.e., fourth node 508). Then, in the second subset of access entries, the entity 102 may use the same operating system and the same access method, but with a different IP address (i.e., the fifth node 510 and the second IP address). The detector system 112 may determine GBAD statistics based on the network path taken within the network graphs.

In some examples, the detector system 112 may generate the network graph baseline profile for the first time period that includes baseline statistics such as the mean and standard deviation of a number of connections (e.g., edges) between two nodes (e.g., the OS node 504 and the AM node 506). For instance, the baseline statistics may indicate that the mean is 2 and the standard deviation is 1. Using process 700 and based on the network graph current profile, the detector system 112 may determine that for the second time period (e.g., the day after the first time period), the user has an OS to AM frequency of 6. The detector system 112 may determine the number of standard deviations from the mean from the network graph baseline profile is 4, which is outside of 99.9% of what is statistically expected. The detector system 112 may determine anomaly data (e.g., a binary indicator of this statistical improbability) based on the standard deviation from the mean.

Referring back to FIG. 2, at block 210, the detector system 112 determines, based on the comparison data, anomaly data comprising one or more flagged network accesses to the enterprise system 108. For example, the comparisons using IDES and GBAD may indicate anomalies (e.g., potential unauthorized access to the enterprise system 108) within the network graph current profile (e.g., the network graph current profile may indicate abnormal behavior) for the entity 102. The detector system 112 may flag these abnormal network accesses by the entity 102 to the enterprise system 108 from analyzing the comparison data.

Figure 8:
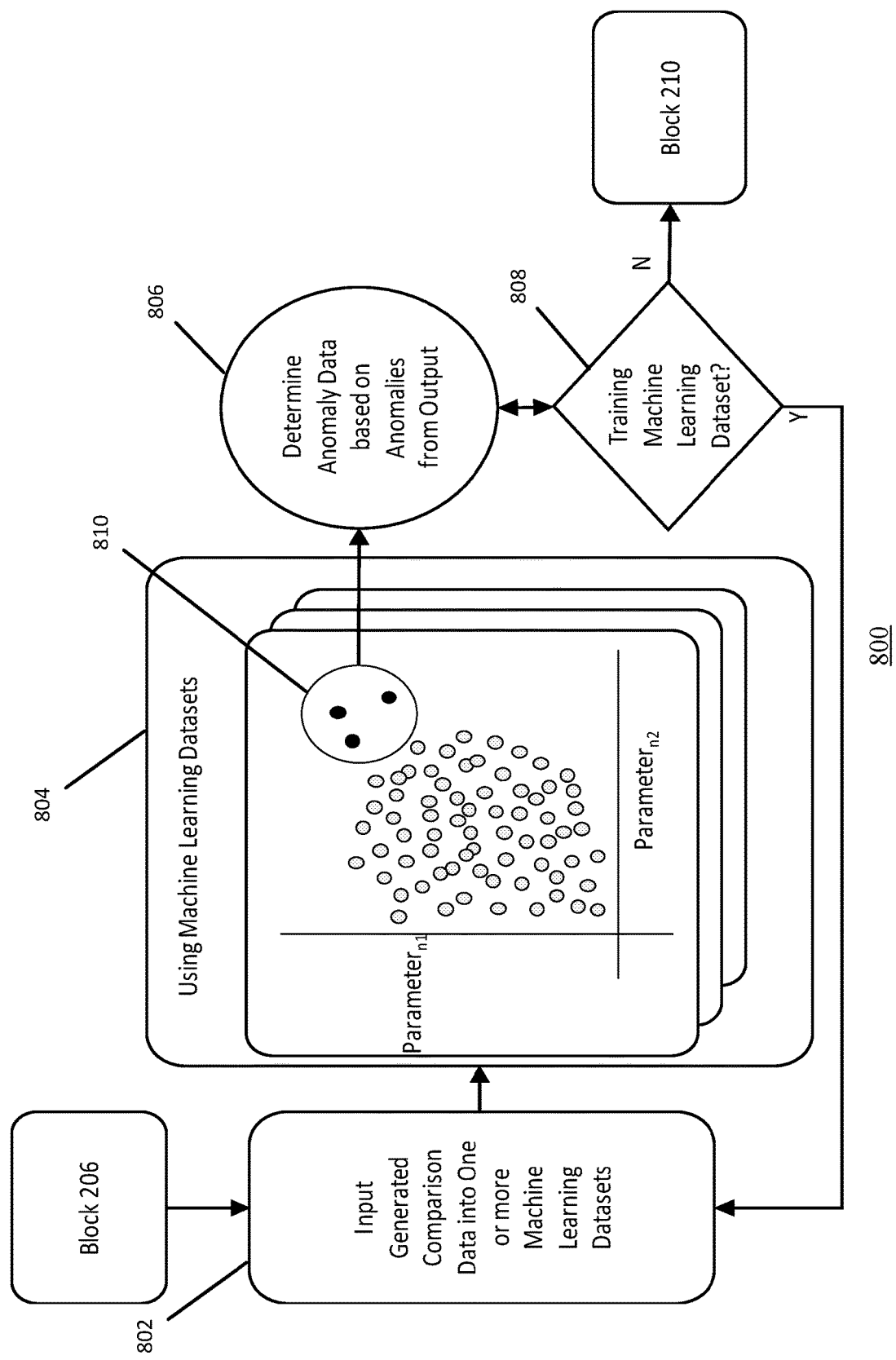
FIG. 8 is another flowchart illustrating another exemplary process for identifying network anomalies using network graphs in accordance with one or more exemplary embodiments of the present application.

Additionally, and/or alternatively, in some instances, the detector system 112 may use artificial intelligence and/or a machine learning dataset to determine the anomaly data. FIG. 8 describes an exemplary process 800 for using the machine learning dataset to determine the anomaly data in more detail. Referring to FIG. 8, at block 802, the detector system 112 inputs the generated comparison data from block 206 into one or more machine learning datasets. For example, the detector system 112 may input the IDES comparison statistics and/or the GBAD comparison statistics into the machine learning dataset.

At block 804, the detector system 112 uses the machine learning dataset to determine anomalies such as outliers 810. For example, after inputting the IDES comparison statistics and/or the GBAD comparison statistics into the machine learning dataset, the detector system 112 may obtain outputs from the machine dataset. As shown, the outputs may be one or more graphs with different parameters $n_1$ and $n_2$. Furthermore, the graphs may indicate outliers or anomalies 810.

In some examples, the detector system 112 may create and/or retrieve the one or more machine learning dataset from memory. The one or more machine learning datasets may be unsupervised models, supervised models, and/or deep learning methods/models (e.g., neural networks). For example, the detector system 112 may create and/or retrieve one or more unsupervised models and may use the unsupervised models to determine if the new data (e.g., data from the network graph baseline profile) is outside of a normal range defined by the network graph baseline profile. The detector system 112 may determine anomalies based on the new data being outside of the normal range. Additionally, and/or alternatively, the detector system 112 may create and/or retrieve one or more supervised models and may use the supervised models to label data and/or create adversarial data that identifies if a new observation (e.g., data from the network graph baseline profile) is adversarial. The detector system 112 may determine anomalies based on whether the new observations are adversarial. Additionally, and/or alternatively, the detector system 112 may create and/or retrieve one or more deep learning models and may use the deep learning models to determine if the new observations are similar to the baseline. The detector system 112 may determine anomalies based on the new observations being different from the baseline.

At block 806, the detector system 112 determines the anomaly data based on the anomalies 810 from the output of the machine learning datasets. For example, the detector system 112 may analyze and/or flag the anomalies 810 from the output of the machine learning dataset.

At block 808, the detector system 112 may determine whether to use the anomalies as training for the machine learning dataset. If no, the process 800 moves to block 210. If yes, the detector system 112 may train the machine learning dataset for the next iteration. For example, the generated comparison data from block 206 may be training data. The detector system 112 may also receive, from the authentication system 114, authentication data indicating whether the anomalies 810 should have been flagged (i.e., unauthorized accesses to the enterprise system 108) and/or additional anomalies that should have been flagged by the machine learning dataset, but were not. Based on the output from the machine learning dataset and the data indicating whether the anomalies 810 were unauthorized accesses and/or additional anomalies, the detector system 112 may train the machine learning dataset.

For example, the detector system 112 may use one or more algorithms, functions, and/or other methods to compare the differences between the output and the data indicating anomalies 810 were correct or whether additional anomalies should have been included. Then, the detector system 112 may feedback this information into the machine learning dataset to train the machine learning dataset. For instance, the detector system 112 may adjust the weights within the machine learning dataset to account for the differences.

Referring back to FIG. 2, at block 212, the detector system 112 may provide the anomaly data indicating the flagged network accesses to the authentication system 114. Based on the anomaly data, the authentication system 114 may provide instructions to direct one or more systems from environment 100 to prevent and/or restrict access to the enterprise system 108. For example, the instructions may direct one or more systems within environment 100 to prevent the entity 102 from accessing the enterprise system 108 until additional actions (e.g., an investigation or entity validation) is performed.

Figure 9:
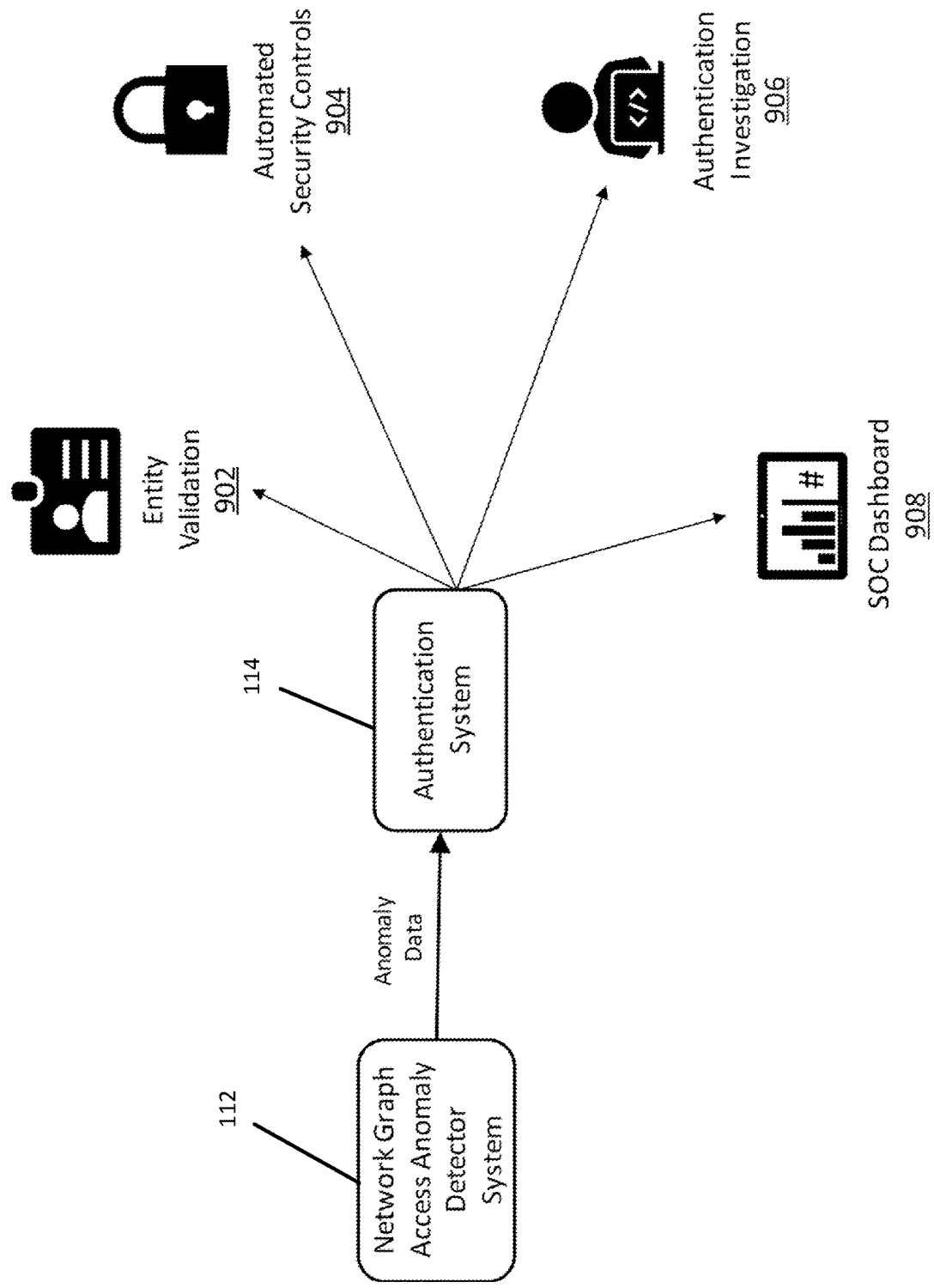
FIG. 9 is an illustration of exemplary uses of the flagged anomalies by an authentication system in accordance with one or more exemplary embodiments of the present application.

FIG. 9 illustrates exemplary uses of the flagged anomalies by the authentication system 114 and describes block 212 in more detail. Referring to FIG. 9, the detector system 112 provides anomaly data to the authentication system 114 and/or one or more instructions to the authentication system 114 to determine whether the one or more flagged network accesses are unauthorized intrusions to the enterprise system 108. The authentication system 114 may provide instructions to direct one or more systems within environment 100 to perform one or more actions or tasks based on the anomaly data and/or the instructions from the detector system 112. For example, the authentication system 114 may provide entity validation 902 for the entity 102 (e.g., the authentication system 114 may provide, to an entity computing system such as 104*a* (e.g., the mobile phone), a request for verification of the entity 102). In other words, after flagging the anomalies, the authentication system 114 may attempt to verify whether the entity 102 accessing the enterprise system 108 has proper credentials. The entity computing system 104*a* may provide information indicating the credentials. The authentication system 114 may authenticate the credentials and based on the authentication, the authentication system 114 may restrict and/or prevent access to the enterprise system 108.

Additionally, and/or alternatively, the authentication system 114 may provide automated security controls 904 for the entity 102. For example, the authentication system 114 may provide one or more instructions to the enterprise system 108. The one or more instructions may direct the enterprise system 108 prevent and/or restrict access to the entity computing systems for the entity 102 until another action has been performed.

Additionally, and/or alternatively, the authentication system 114 may perform an authentication investigation 906 for the entity 102. For example, the authentication system 114 may perform an authentication investigation to determine whether the accesses to the enterprise system 108 are valid. If not, the authentication system 114 may prevent access by the entity 102 and/or the entity computing systems to access the enterprise system 108.

In other words, the authentication system 114 may include a display and may display the flagged anomalies to alert the enterprise organization that an unauthorized access to the enterprise system 108 may have occurred. The anomaly data may also indicate the access entries such as the entity 102 and/or additional information such as the operating system, IP address, and access method. Furthermore, in some examples, the authentication system 114 may provide recommendations for the unauthorized access such as resetting the password.

Additionally, and/or alternatively, the authentication system 114 may display the flagged anomalies on a security operations center (SOC) dashboard 908. For example, the enterprise organization may include an SOC team that is responsible for monitoring alerts and performing investigations on the alerts. The authentication system 114 may display the flagged anomalies and the SOC team may respond to the displayed alerts.

Figure 10:
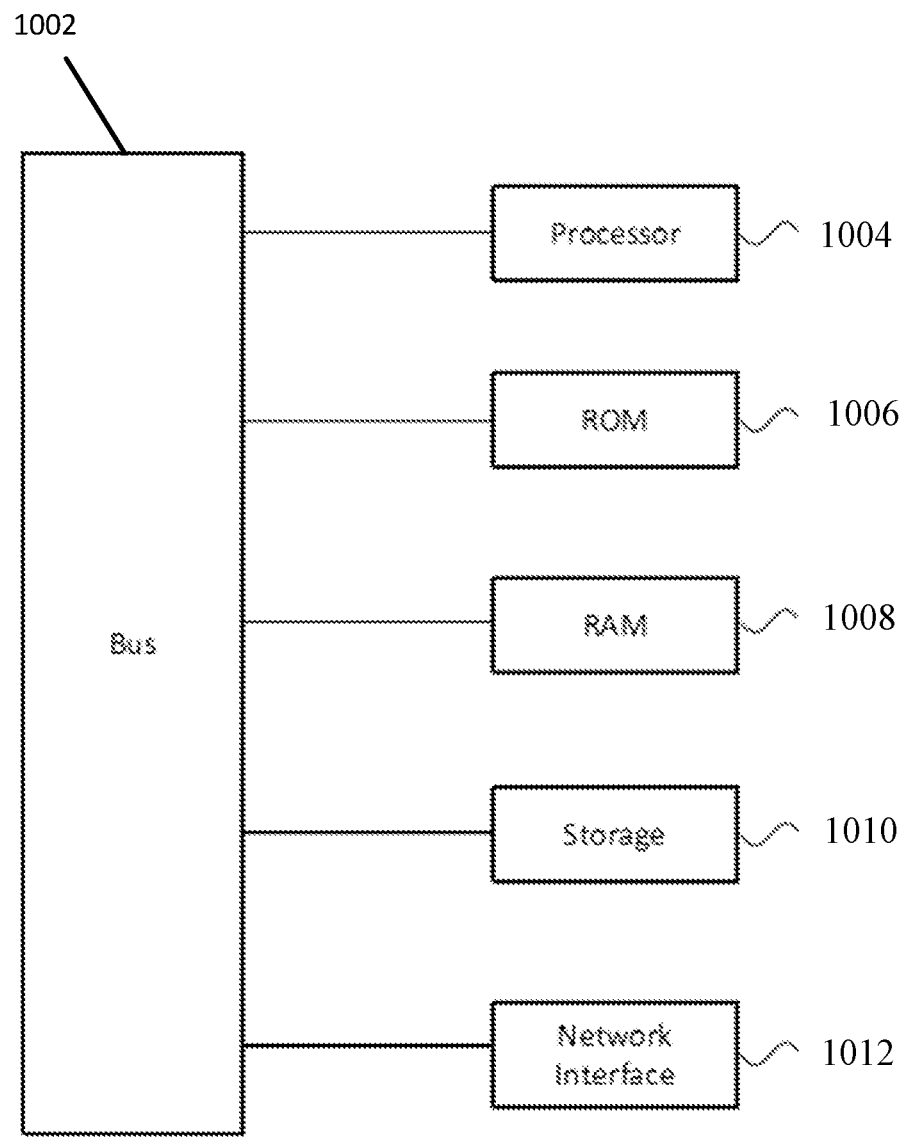
FIG. 10 is a simplified block diagram of one or more devices within the exemplary system of FIG. 1.

FIG. 10 is block diagram of a system 1000 such as the systems within the environment 100. The system 1000 includes a processor 1004, such as a central processing unit (CPU), controller, and/or logic, that executes computer executable instructions for performing the functions, processes, and/or methods described above. In some examples, the computer executable instructions are locally stored and accessed from a non-transitory computer readable medium, such as storage 1010, which may be a hard drive or flash drive. Read Only Memory (ROM) 1006 includes computer executable instructions for initializing the processor 1004, while the random-access memory (RAM) 1008 is the main memory for loading and processing instructions executed by the processor 1004. The network interface 1012 may connect to a wired network or cellular network and to a local area network or wide area network, such as the network 106. The system 1000 may also include a bus 1002 that connects the processor 1004, ROM 1006, RAM 1008, storage 1010, and/or the network interface 1012. The components within the system 1000 may use the bus 1002 to communicate with each other.

The system of FIG. 10 may be used to implement the methods and systems described above. For example, the detector system 112 may include one or more systems 1000. Similarly, the other systems 108, 110, 114, and/or 104*a* through 104*c* may include one or more systems 1000. The detector system 112 may perform the processes shown above including, but not limited to processes 200, 400, 600, 700, and/or 800.

It will be appreciated that the figures of the present application and their corresponding descriptions are merely exemplary, and that the invention is not limited to these exemplary situations.

It will further be appreciated by those of skill in the art that the execution of the various machine-implemented processes and steps described herein may occur via the computerized execution of processor-executable instructions stored on a non-transitory computer-readable medium, e.g., random access memory (RAM), read-only memory (ROM), programmable read-only memory (PROM), volatile, nonvolatile, or other electronic memory mechanism. Thus, for example, the operations described herein as being performed by computing devices and/or components thereof may be carried out by according to processor-executable instructions and/or installed applications corresponding to software, firmware, and/or computer hardware.

The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

It will be appreciated that the embodiments of the invention described herein are merely exemplary. Variations of these embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method, comprising:
obtaining, from a data storage and access system associated with an enterprise system, access data for an entity, wherein the access data comprises a plurality of access entries associated with network elements the entity uses to access the enterprise system, wherein each of the plurality of access entries comprises a plurality of data elements;

generating a network graph baseline profile based on the plurality of data elements, wherein the network graph baseline profile comprises a plurality of baseline network graphs, and wherein each network graph comprises a plurality of baseline nodes and a plurality of baseline edges;

generating a network graph current profile based on the plurality of data elements, wherein the network graph current profile comprises one or more current network graphs, wherein the one or more current network graphs comprise a plurality of current nodes and a plurality of current edges, and wherein each of the plurality of baseline network graphs and the one or more current network graphs are associated with an access entry from the plurality of access entries;

generating comparison data based on
comparing the plurality of baseline network graphs with the one or more current network graphs, and
comparing the plurality of baseline nodes and the plurality of baseline edges with the plurality of current nodes and the plurality of current edges;

determining, based on the comparison data, anomaly data comprising one or more flagged network accesses to the enterprise system; and providing the anomaly data indicating the one or more flagged network accesses to an authentication system.

2. The method of claim 1, wherein the plurality of access entries comprise a plurality of first access entries corresponding to a first time period and a plurality of second access entries corresponding to a second time period, wherein the second time period is subsequent to the first time period, wherein generating the network graph baseline profile is based on using the plurality of data elements from the plurality of first access entries, and wherein generating the network graph current profile is based on using the plurality of data elements from the plurality of second access entries.

3. The method of claim 1, wherein the plurality of baseline nodes are associated with the plurality of data elements within a first time period and the plurality of baseline edges are associated with connections between the plurality of data elements within the first time period, and
wherein the plurality of current nodes are associated with the plurality of data elements within a second time period and the plurality of current edges are associated with connections between the plurality of data elements within the second time period.

4. The method of claim 1, wherein comparing the plurality of baseline network graphs with the one or more current network graphs is based on using graph based anomaly detection (GBAD), and
wherein comparing the plurality of baseline nodes and the plurality of baseline edges with the plurality of current nodes and the plurality of current edges is based on using intrusion detection expert system (IDES).

5. The method of claim 4, wherein determining the anomaly data is based on using a machine learning dataset and the comparison data.

6. The method of claim 1, wherein determining the anomaly data comprises:
determining the one or more flagged network accesses to the enterprise system based on inputting the comparison data into a machine learning dataset, wherein the one or more flagged network accesses are statistical outliers that are output from the machine learning dataset.

7. The method of claim 6, further comprising:
receiving, from the authentication system, authentication data for the machine learning dataset; and
training the machine learning dataset based on the one or more flagged network accesses and the authentication data.

8. The method of claim 1, wherein providing the anomaly data indicating the one or more flagged network accesses to the authentication system comprises providing instructions to the authentication system to determine whether the one or more flagged network accesses are unauthorized intrusions to the enterprise system.

9. The method of claim 8, wherein the authentication system restricts access to the enterprise system based on the one or more flagged network accesses indicating the unauthorized intrusions to the enterprise system.

10. The method of claim 1, wherein the plurality of data elements comprise an access method indicating an application used to access the enterprise system.

11. A data storage and access system associated with an enterprise system, comprising:
a processor; and
non-transitory computer-readable medium having processor-executable instructions stored thereon, wherein the processor-executable instructions, when executed, facilitate:
obtaining access data for an entity, wherein the access data comprises a plurality of access entries associated with network elements the entity uses to access the enterprise system, wherein each of the plurality of access entries comprises a plurality of data elements;
generating a network graph baseline profile based on the plurality of data elements, wherein the network graph baseline profile comprises a plurality of baseline network graphs, and wherein each network graph comprises a plurality of baseline nodes and a plurality of baseline edges;
generating a network graph current profile based on the plurality of data elements, wherein the network graph current profile comprises one or more current network graphs, wherein the one or more current network graphs comprise a plurality of current nodes and a plurality of current edges, and wherein each of the plurality of baseline network graphs and the one or more current network graphs are associated with an access entry from the plurality of access entries;
generating comparison data based on
comparing the plurality of baseline network graphs with the one or more current network graphs, and
comparing the plurality of baseline nodes and the plurality of baseline edges with the plurality of current nodes and the plurality of current edges;
determining, based on the comparison data, anomaly data comprising one or more flagged network accesses to the enterprise system; and
providing the anomaly data indicating the one or more flagged network accesses to an authentication system.

12. The data storage and access system of claim 11, wherein the plurality of access entries comprise a plurality of first access entries corresponding to a first time period and a plurality of second access entries corresponding to a second time period, wherein the second time period is subsequent to the first time period, wherein generating the network graph baseline profile is based on using the plurality of data elements from the plurality of first access entries, and wherein generating the network graph current profile is based on using the plurality of data elements from the plurality of second access entries.

13. The data storage and access system of claim 11, wherein the plurality of baseline nodes are associated with the plurality of data elements within a first time period and the plurality of baseline edges are associated with connections between the plurality of data elements within the first time period, and wherein the plurality of current nodes are associated with the plurality of data elements within a second time period and the plurality of current edges are associated with connections between the plurality of data elements within the second time period.

14. The data storage and access system of claim 11, wherein comparing the plurality of baseline network graphs with the one or more current network graphs is based on using graph based anomaly detection (GBAD), and wherein comparing the plurality of baseline nodes and the plurality of baseline edges with the plurality of current nodes and the plurality of current edges is based on using intrusion detection expert system (IDES).

15. The data storage and access system of claim 14, wherein determining the anomaly data is based on using a machine learning dataset and the comparison data.

16. The data storage and access system of claim 11, wherein determining the anomaly data comprises:

determining the one or more flagged network accesses to the enterprise system based on inputting the comparison data into a machine learning dataset, wherein the one or more flagged network accesses are statistical outliers that are output from the machine learning dataset.

17. The data storage and access system of claim 16, wherein the processor-executable instructions, when executed, further facilitate:

receiving, from the authentication system, authentication data for the machine learning dataset; and training the machine learning dataset based on the one or more flagged network accesses and the authentication data.

18. The data storage and access system of claim 11, wherein the plurality of data elements comprise an access method indicating a method used to access the enterprise system.

19. The data storage and access system of claim 11, wherein providing the anomaly data indicating the one or more flagged network accesses to the authentication system comprises:

providing instructions to the authentication system to determine whether the one or more flagged network accesses are unauthorized intrusions to the enterprise system, and wherein the authentication system is configured to restrict access to the enterprise system based on the one or more flagged network accesses indicating the unauthorized intrusions to the enterprise system.

20. A non-transitory computer-readable medium having processor-executable instructions stored thereon, wherein the processor-executable instructions, when executed, facilitate:

obtaining access data for an entity, wherein the access data comprises a plurality of access entries associated with network elements the entity uses to access an enterprise system, wherein each of the plurality of access entries comprises a plurality of data elements;

generating a network graph baseline profile based on the plurality of data elements, wherein the network graph baseline profile comprises a plurality of baseline network graphs, and wherein each network graph comprises a plurality of baseline nodes and a plurality of baseline edges;

generating a network graph current profile based on the plurality of data elements, wherein the network graph current profile comprises one or more current network graphs, wherein the one or more current network graphs comprise a plurality of current nodes and a plurality of current edges, and wherein each of the plurality of baseline network graphs and the one or more current network graphs are associated with an access entry from the plurality of access entries;

generating comparison data based on comparing the plurality of baseline network graphs with the one or more current network graphs, and comparing the plurality of baseline nodes and the plurality of baseline edges with the plurality of current nodes and the plurality of current edges;

determining, based on the comparison data, anomaly data comprising one or more flagged network accesses to the enterprise system; and providing the anomaly data indicating the one or more flagged network accesses to an authentication system.

* * * * *